United States Patent
Ramavajjala et al.

(10) Patent No.: US 8,112,168 B2
(45) Date of Patent: Feb. 7, 2012

(54) PROCESS AND METHOD FOR A DECOUPLED MULTI-PARAMETER RUN-TO-RUN CONTROLLER

(75) Inventors: Madhu Sudan Ramavajjala, Plano, TX (US); Kristi Bushman, Richardson, TX (US); Robert Ray Spangler, Lucas, TX (US); Stephen Arlon Meinser, Allen, TX (US); Ronald Charles Roth, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 393 days.

(21) Appl. No.: 12/511,370

(22) Filed: Jul. 29, 2009

(65) Prior Publication Data

US 2011/0029119 A1 Feb. 3, 2011

(51) Int. Cl.
*G06F 19/00* (2011.01)

(52) U.S. Cl. ........................ 700/105; 700/121

(58) Field of Classification Search .................. 700/105, 700/121
See application file for complete search history.

(56) References Cited

U.S. PATENT DOCUMENTS

| | | | |
|---|---|---|---|
| 6,735,492 B2 * | 5/2004 | Conrad et al. | 700/121 |
| 6,741,903 B1 * | 5/2004 | Bode et al. | 700/121 |
| 7,184,853 B2 * | 2/2007 | Roberts et al. | 700/124 |
| 2004/0093110 A1 * | 5/2004 | Chong et al. | 700/121 |
| 2006/0265097 A1 * | 11/2006 | Roberts et al. | 700/121 |

* cited by examiner

*Primary Examiner* — Kakali Chaki
*Assistant Examiner* — Sivalingam Sivanesan
(74) *Attorney, Agent, or Firm* — Jacqueline J. Garner; Wade J. Brady, III; Frederick J. Telecky, Jr.

(57) ABSTRACT

A manufacturing process including a controller method to generate a tool setting which includes a tool offset and a device offset. The controller method uses a device parameter measurement to update the tool offset and device offset. A tool weight and a device weight is assigned so that only one of the tool offset and device offset is significantly changed during the update. The process may be applied to semiconductor device manufacturing and particularly to integrated circuit fabrication.

20 Claims, 7 Drawing Sheets

PROCESS AND METHOD FOR A DECOUPLED MULTI-PARAMETER RUN-TO-RUN CONTROLLER

FIELD OF THE INVENTION

This invention relates to the field of manufacturing processes. More particularly, this invention relates to controlling tool settings during manufacturing processes.

BACKGROUND OF THE INVENTION

It is common for tools used in manufacturing processes to have adjustable settings which affect parameters of articles produced by the manufacturing processes. It is further common for a manufacturing process to use a set of one or more tools to perform a particular fabrication step, each tool in the set being capable of performing the fabrication step, to provide a desired level of capacity for the manufacturing process. Moreover, it is common for more than one model of article to be produced by such a manufacturing process in which instances of each model are processed through more than one tool in the set, and in which each tool in the set processes instances of more than one model. Adjusting the settings of the tools to produce the articles with parameters close to desired values may be problematic when models have different desired parameter values and/or performances of the tools drift.

SUMMARY OF THE INVENTION

The instant invention provides a manufacturing process which uses a controller method of generating offsets for tool parameter settings for multiple devices so as to reduce differences between measured device parameter values and corresponding parameter targets. The tool parameter settings generated by the controller method include tool offsets and device offsets. After device parameters are measured, the controller method updates values of the appropriate tool offset and device offset, such that only one of the tool offset and device offset is significantly changed.

The controller method includes three separate modes of operation: generating tool parameter settings for a characterized tool which is processing a characterized device, generating tool parameter settings for an uncharacterized tool, and generating tool parameter settings for a characterized tool which is processing an uncharacterized lot.

DETAILED DESCRIPTION

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide a full understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

For the purposes of this specification, the term "tool" will refer to items of manufacturing equipment which perform a fabrication step on a workpiece. For example, the term "tool" may refer to a photolithographic wafer stepper which exposes a pattern in a layer of photoresist on a semiconductor wafer, the workpiece being the semiconductor wafer including the photoresist layer.

The instant invention provides a controller method of generating offsets for tool parameter settings for one or more tools performing a fabrication step in a manufacturing process which fabricates multiple instances, referred to herein as lots, of possibly more than one model, referred to herein as a device, of a manufactured article so as to reduce differences between measured device parameter values and corresponding desired device parameter values, referred to herein as parameter target values. Differences between the measured device parameter values and the corresponding desired device parameter values are referred to herein as error values. In this context, a lot may include more than one physical article of manufacture.

The tool parameter settings take into account tool offsets which are specific to each tool and device offsets which are specific to each device. After device parameters of a lot are measured, the controller method computes updated values of the appropriate tool offset and device offset. Tool weights and devices weights are applied to the updating process so that only one of the tool offset and device offset is significantly changed. Manufacturing process flows in which device parameters are measured on a subset of the processed lots, and in which device parameters are measured on lots in a different sequence than a sequence of performing the fabrication step, are accommodated by the inventive method.

Devices which have had a prescribed number of lots fabricated using the inventive method are referred to herein as characterized devices. Uncharacterized devices, for example new devices that are being introduced into the manufacturing process, have not met this criterion. Similarly, characterized tools have fabricated a prescribed number of lots; uncharacterized tools, for example tools newly installed in the manufacturing process or refurbished tools, have not processed the prescribed number of lots. The controller method includes three separate modes of operation: generating tool parameter settings for a characterized tool which is processing a characterized device, generating tool parameter settings for an uncharacterized tool, and generating tool parameter settings for a characterized tool which is processing an uncharacterized lot.

During operation on a characterized tool and a characterized device, the controller method updates the tool offset while maintaining cumulative sums of error values for the tool and the device. If the tool cumulative error sum exceeds a prescribed limit, action such as repair or maintenance of the tool may be performed. If the device cumulative error sum exceeds a prescribed limit, the appropriate device offset is adjusted and updated.

During operation on an uncharacterized tool, the controller method updates the tool offset, but does not update the cumulative error sums. During operation on an uncharacterized device, the controller method updates the device offset, but not the cumulative error sums. The device offset may be updated by making relatively large corrections on initial lots followed by smaller corrections on subsequent lots.

Figure 1:
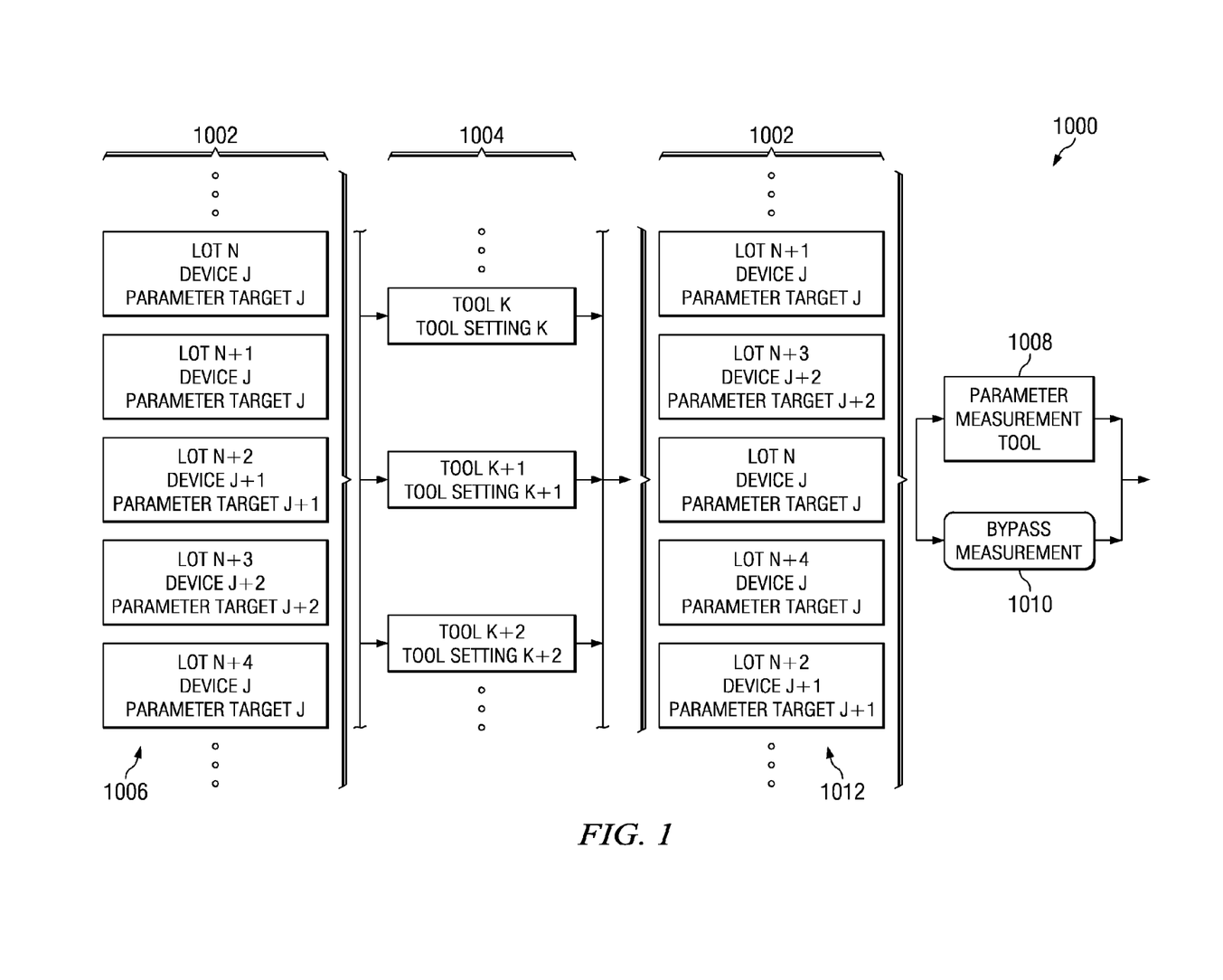
FIG. 1 depicts a process flow to which an embodiment of the instant invention may be applied.

FIG. 1 depicts a process flow (1000) to which an embodiment of the instant invention may be applied. Lots (1002) are processed by a set of tool (1004). Each lot (1002) includes one or more instances of a particular device, as depicted in FIG. 1. Each unique device has a corresponding parameter target. Each tool (1004) has a tool setting appropriate to the tool (1004), as depicted in FIG. 1. The lots (1002) are processed by the tools (1004) in a first sequence (1006).

After processing through the tools (1004), each lot (1002) may have a device parameter measured by a measurement tool (1008) or may bypass measurement, as denoted by the bypass operation (1010). The lots (1002) may be measured in a second sequence (1012) which is different from the first sequence (1006).

Figure 2:
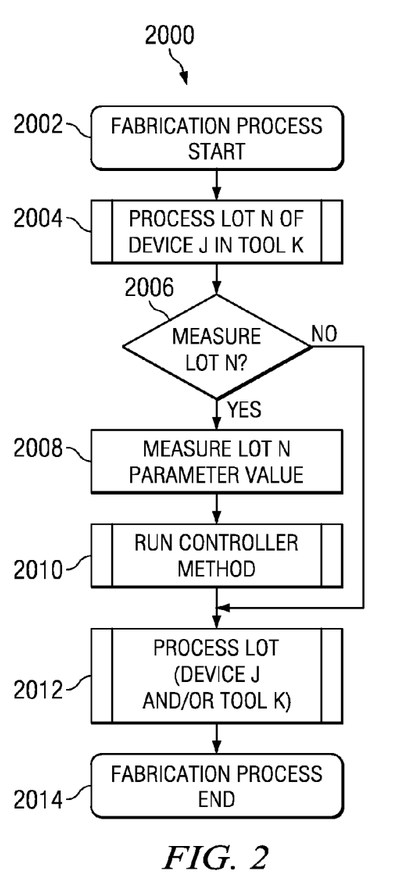
FIG. 2 is a flowchart of the process flow depicted in FIG. 1.

FIG. 2 is a flowchart (2000) of the fabrication process depicted in FIG. 1. The fabrication process begins (2002) with step (2004), which is to process Lot N of Device J in Tool K. Step (2004) includes generating a tool setting for Tool K using a current value of a Tool K offset and a current value of a Device J offset. The details of step (2004) will be discussed in reference to FIG. 3.

Next is step (2006) which is a decision of whether or not to measure Lot N. If the decision is yes, step (2008) is executed, which is to measure a value of a device parameter of Lot N. If step (2008) is executed, step (2010) is subsequently executed, which is to run the controller method. The step of running the controller method includes updating the current value of the Tool K offset and the current value of the Device J offset. The details of step (2010) will be discussed in reference to FIG. 4.

After step (2010) is executed, or if the result of step (2006) is no so that steps (2008) and (2010) are bypassed, step (2012) is to process a second lot. The second lot is either a Device J lot or is process on Tool K, or both, so that at least one of the updated Device J offset and the updated Tool K offset is used to generate an updated tool setting to process the second lot. After step (2102) is executed, the fabrication process is ended (2014).

Figure 3:
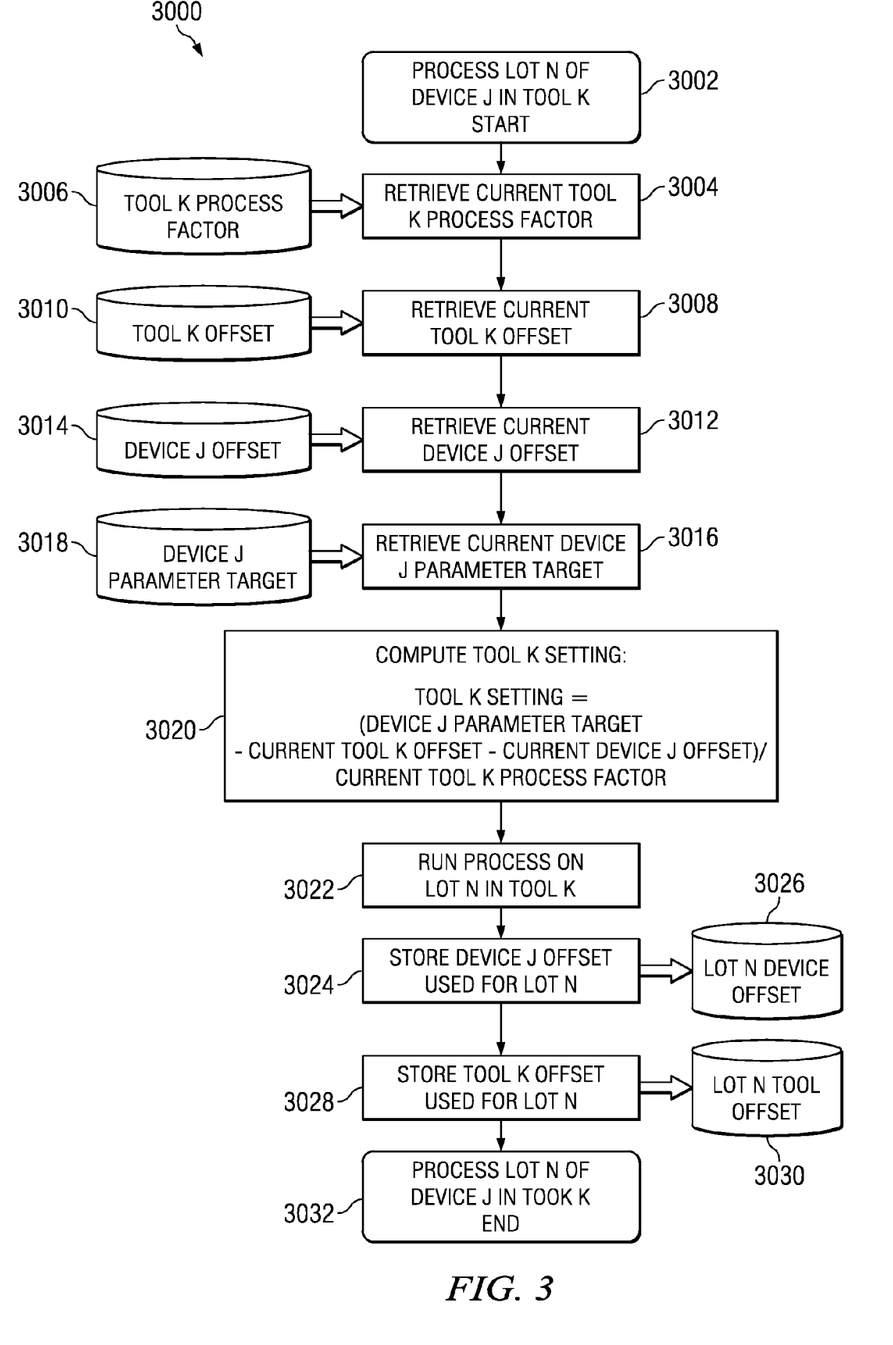
FIG. 3 is a flowchart of an embodiment of steps involved in processing Lot N of Device J in Tool K.

FIG. 3 is a flowchart (3000) of an embodiment of steps involved in processing Lot N of Device J in Tool K. The steps begin (3002) with step (3004) which is to retrieve a current value of a Tool K process factor, which is stored (3006). Step (3008) is to retrieve a current value of a Tool K offset, which is stored (3010). Step (3012) is to retrieve a current value of a Device J offset, which is stored (3014). Step (3016) is to retrieve a Device J parameter target value, which is stored (3018). In an alternate embodiment, steps (3004), (3008), (3012) and (3016) may be performed in another order.

Next, step (3020) is to compute a value of a setting for Tool K. In the instant embodiment, the Device J parameter is taken to be a linear function of the Tool K setting, offset by the Tool K offset and the Device J offset. A slope of the Device J parameter with respect to the Tool K setting is a Tool K process factor. The Tool K setting is computed, for example using EQN. 1.

$$\text{Tool } K \text{ offset} = \frac{\text{Device } J \text{ parameter target} - \text{Tool } K \text{ offset} - \text{Device } J \text{ offset}}{\text{Tool } K \text{ process factor}} \quad \text{EQN. 1}$$

Subsequent to computing the Tool K setting, step (3022) is to process Lot N in Tool K set at the Tool K setting value computed in step (3020). Step (3024) is to store the value of the Device J offset used to process Lot N in a storage medium (3026). Step (3028) is to store the value of the Tool K offset used to process Lot N in a storage medium (3030). In an alternate embodiment, steps (3022), (3024) and (3028) may be performed in another order. After completion of the above steps, processing Lot N of Device J in Tool K is ended (3032).

Figure 4:
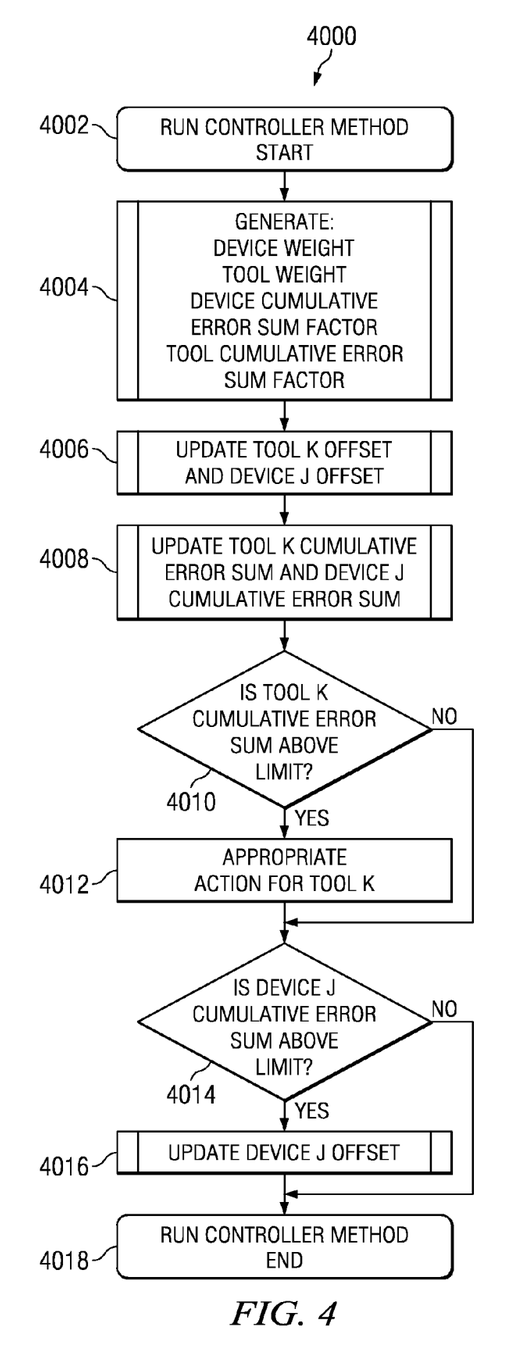
FIG. 4 is a flowchart of an embodiment of steps involved in measuring Lot N.

FIG. 4 is a flowchart (4000) of an embodiment of steps involved in measuring Lot N. The steps begin (4002) with step (4004) which is to generate a device weight, a tool weight, a device cumulative error sum factor and a tool cumulative error sum factor. Details of the computations involved in step (4004) are discussed in reference to FIG. 5. Next, step (4006) is to compute updated values of the Tool K offset and the Device J offset. Details of the computations involved in step (4006) are discussed in reference to FIG. 6. Step (4008) is to update a Tool K cumulative error sum and a Device J cumulative error sum. Details of the computations involved in step (4008) are discussed in reference to FIG. 7.

Subsequently, step (4010) determines if the Tool K cumulative error sum is above a prescribed limit. If a result of step (4010) is yes, step (4012) is executed, which is to take an appropriate action for Tool K. In one embodiment, Tool K may be cleaned, repaired, refurbished or otherwise modified. In another embodiment, the Tool K offset and/or Tool K process factor may be modified.

Following execution of step (4012), or step (4010) if the result of step (4010) is no, step (4014) determines if the Device J cumulative error sum is above a prescribed limit. If a result of step (4014) is yes, step (4016) is executed, which is to update the Device J offset. Details involved in step (4016) are discussed in reference to FIG. 8. Following execution of step (4016), or step (4014) if the result of step (4014) is no, the process of measuring Lot N is ended (4018).

Figure 5:
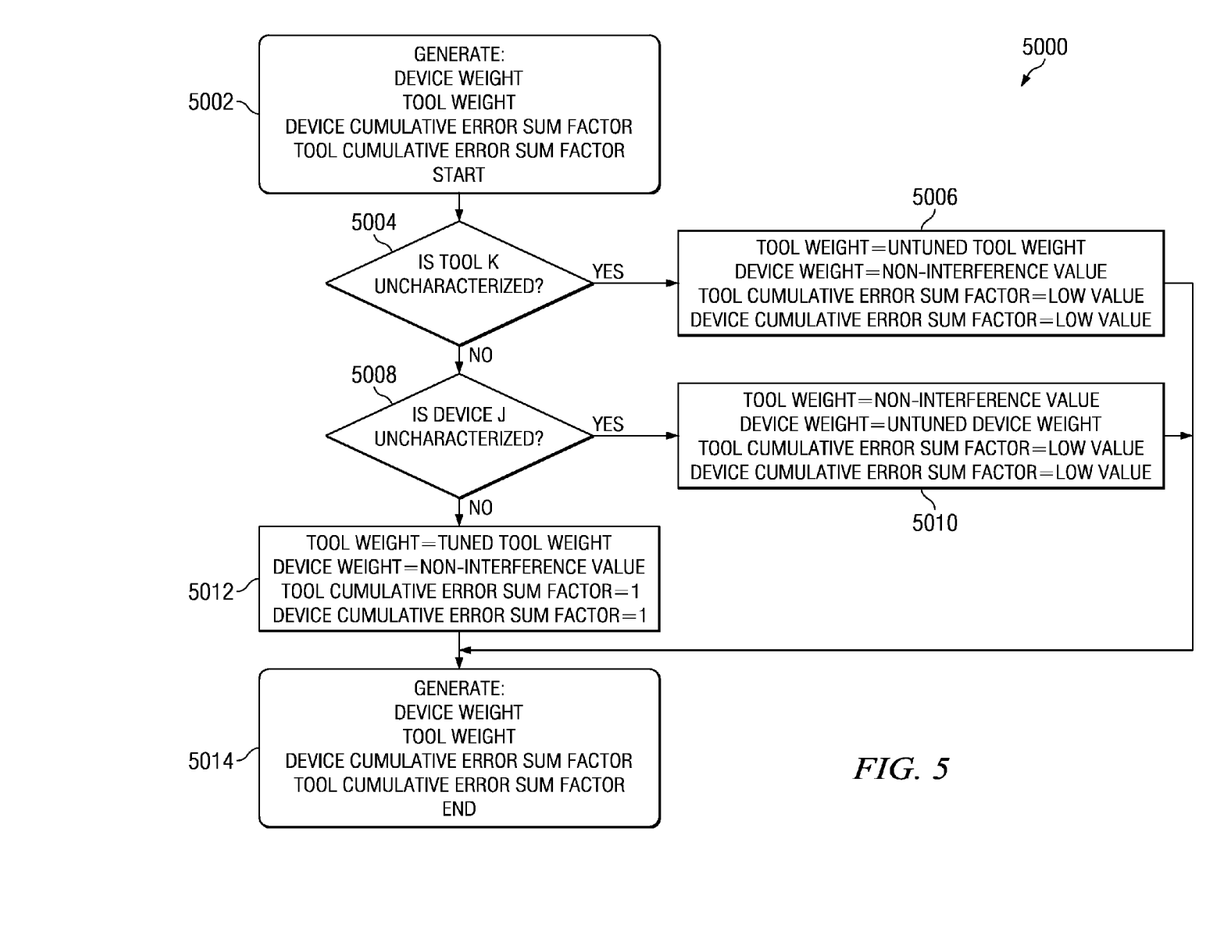
FIG. 5 is a flowchart of an embodiment of steps involved in generating a device weight, a tool weight, a device cumulative error sum factor and a tool cumulative error sum factor.

FIG. 5 is a flowchart (5000) of an embodiment of steps involved in generating a device weight, a tool weight, a device cumulative error sum factor and a tool cumulative error sum factor. The steps begin (5002) with step (5004) which is to determine if Tool K is designated as uncharacterized. In one embodiment, Tool K may be designated as uncharacterized if a prescribed number of lots, for example four lots, have not been run through tool K and subsequently measured, since Tool K began its uncharacterized status. In another embodiment, Tool K may be designated as uncharacterized if measured parameters of lots run through Tool K are not within a prescribed range. In a further embodiment, Tool K may be designated as uncharacterized based on other criteria.

If a result of step (5004) is yes, step (5006) is executed. A first sub-step of step (5006) is to assign the tool weight a value for an uncharacterized tool, referred to as an untuned tool weight. In one embodiment, the untuned tool weight may be a fixed value, for example 0.25. In another embodiment, the untuned tool weight may be less than a previous value of the untuned tool weight applied to Tool K. In a further embodiment, the untuned tool weight may be dependent on the measured parameter value of Lot N.

A second sub-step of step (5006) is to assign a non-interference value to the device weight, so that parameter error values resulting from Tool K being uncharacterized do not interfere with subsequent adjustments to the Device J offset. In one embodiment, the device weight may be assigned a number with an absolute value less than a prescribed fraction, for example one percent, of the tool weight value assigned in the first sub-step of step (5006). In another embodiment, the device weight may be assigned a value of zero. In a further embodiment, the device weight may be assigned a low fixed value, for example 0.00015.

A third sub-step of step (5006) is to assign the device cumulative error sum factor a low incrementing value, for example 0.001 or zero. A fourth sub-step of step (5006) is to assign the lot cumulative error sum factor a low incrementing value, for example 0.001 or zero. One purpose of assigning low incrementing values to the cumulative error sum factors is to prevent error values resulting from Tool K being uncharacterized leading to undesired increases in a Device J cumulative error sum and/or a Tool K cumulative error sum.

If the result of step (5004) is no, step (5008) is executed, which is to determine if Device J is designated as uncharacterized. In one embodiment, Device J may be designated as uncharacterized if a prescribed number of lots of Device J, for example ten lots, have not been run and subsequently measured, since Device J began its uncharacterized status. In another embodiment, Device J may be designated as uncharacterized if measured parameters of lots of Device J are not within a prescribed range. In a further embodiment, Device J may be designated as uncharacterized based on other criteria.

If a result of step (5008) is yes, step (5010) is executed. A first sub-step of step (5006) is to assign the device weight a value for an uncharacterized device, referred to as an untuned device weight. In one embodiment, the untuned device weight may be a fixed value, for example 0.20. In another embodiment, the untuned tool weight may be dependent on the measured parameter value of Lot N. In a further embodiment, the untuned device weight may be less than a previous value of the untuned device weight applied to Device J. In a particular embodiment, the untuned device weight may be computed using EQN 2.

$$\text{Untuned device weight} = \text{initial weight} \cdot \frac{1-n}{(1+n)^\alpha} \qquad \text{EQN. 2}$$

Where: initial weight is a fixed value, for example 0.75
n is a number of lots of Device J measured since Device J was designated as uncharacterized
α is a fixed exponent value, for example 1.733

The values for the initial weight and α in EQN. 2 may be selected such that all the untuned device weight values assigned while Device J is designated as uncharacterized sum to a prescribed number, for example a value between 2.75 and 3.5, which provides a desired rate of tuning the device J offset.

A second sub-step of step (5010) is to assign a non-interference value to the tool weight, so that parameter error values resulting from Device J being uncharacterized do not interfere with subsequent adjustments to the Tool K offset. In one embodiment, the tool weight may be assigned a number with an absolute value less than a prescribed fraction, for example one percent, of the device weight value assigned in the first sub-step of step (5010). In another embodiment, the tool weight may be assigned a value of zero. In a further embodiment, the tool weight may be assigned a low fixed value, for example 0.00015.

A third sub-step of step (5010) is to assign the device cumulative error sum factor a low incrementing value, for example 0.001 or zero. A fourth sub-step of step (5010) is to assign the lot cumulative error sum factor a low incrementing value, for example 0.001 or zero. One purpose of assigning low incrementing values to the cumulative error sum factors is to prevent error values resulting from Device J being uncharacterized leading to undesired increases in a Device J cumulative error sum and/or a Tool K cumulative error sum.

If the result of step (5008) is no, step (5012) is executed. A first sub-step of step (5012) is to assign the tool weight a value for a characterized tool, referred to as a tuned tool weight. In one embodiment, the tuned tool weight may be a fixed value, for example 0.15. In another embodiment, the tuned tool weight may be less than a previous value of the tuned tool weight applied to Tool K. In a further embodiment, the tuned tool weight may be dependent on the measured parameter value of Lot N.

A second sub-step of step (5012) is to assign a non-interference value to the device weight, so that the Device J offset is not significantly altered with each measured lot. In one embodiment, the device weight may be assigned a number with an absolute value less than a prescribed fraction, for example one percent, of the tool weight value assigned in the first sub-step of step (5012). In another embodiment, the device weight may be assigned a value of zero. In a further embodiment, the device weight may be assigned a low fixed value, for example 0.00015.

A third sub-step of step (5012) is to assign the device cumulative error sum factor a value which causes the Device J cumulative error sum to be updated with information from the Lot N measurement. In one embodiment, the device cumulative error sum factor may be assigned a value of 1. In another embodiment, the device cumulative error sum factor may be assigned a value dependent on the measured parameter value of Lot N.

A fourth sub-step of step (5006) is to assign the tool cumulative error sum factor a value which causes the Tool K cumulative error sum to be updated with information from the Lot N measurement. In one embodiment, the tool cumulative error sum factor may be assigned a value of 1. In another embodiment, the tool cumulative error sum factor may be assigned a value dependent on the measured parameter value of Lot N.

After step (5006), step (5010) or step (5012) is completed, the process of generating a device weight, a tool weight, a device cumulative error sum factor and a tool cumulative error sum factor is ended (5014).

Figure 6:
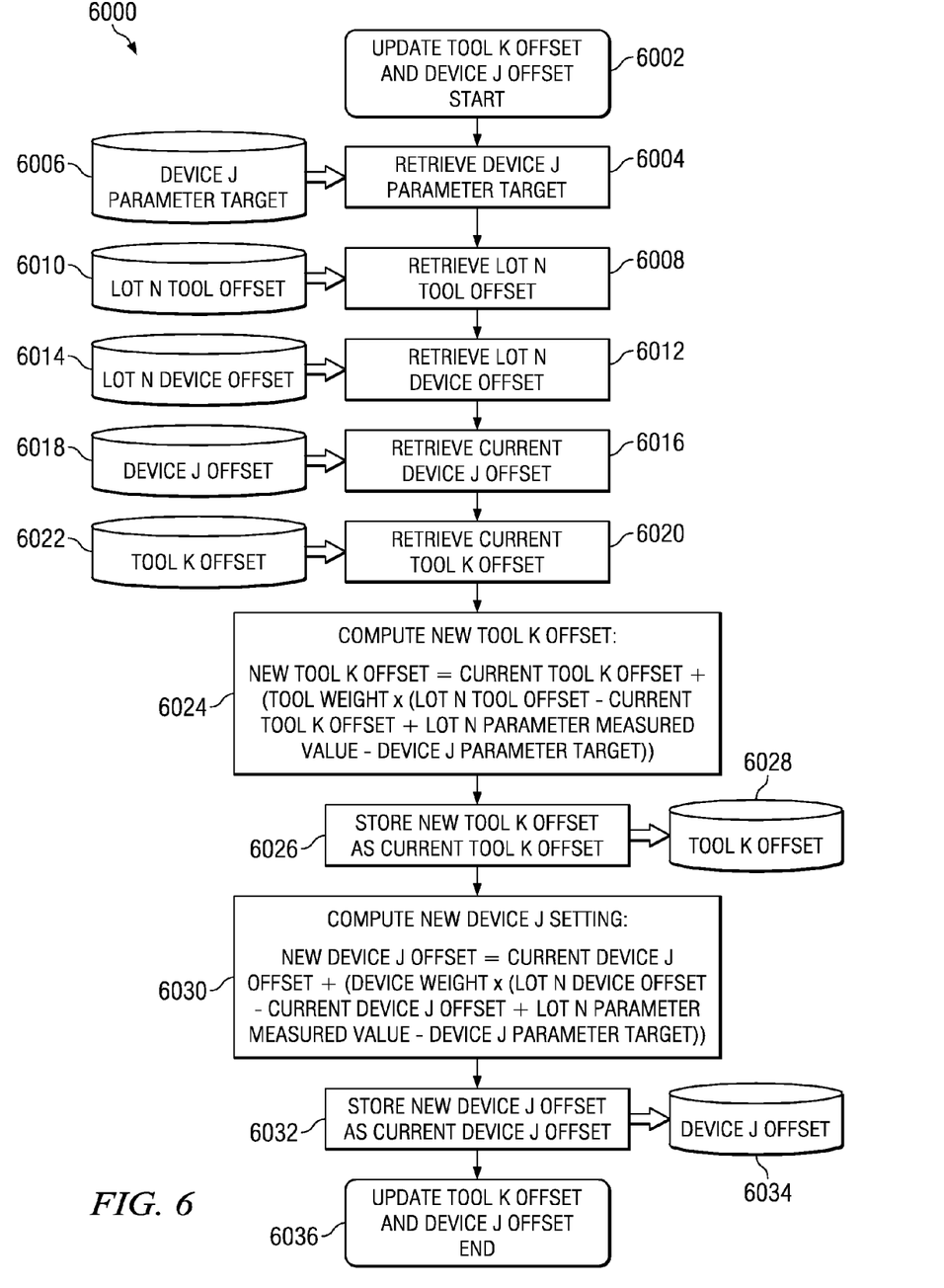
FIG. 6 is a flowchart of an embodiment of steps involved in updating the Tool K offset and the Device J offset.

FIG. 6 is a flowchart (6000) of an embodiment of steps involved in updating the Tool K offset and the Device J offset. The steps begin (6002) with step (6004), which is to retrieve a stored value (6006) of the Device J parameter target. Step (6008) is to retrieve the stored value (6010) of the Lot N tool offset. Step (6012) is to retrieve the stored value (6014) of the Lot N device offset. Step (6016) is to retrieve the stored value (6018) of the current Device J offset. Step (6020) is to retrieve the stored value (6022) of the current Tool K offset. In another embodiment, steps (6004), (6008), (6012) and (6016) may be performed in another order.

Subsequently, step (6024) is executed, which is to compute a new value for the Tool K offset, using a formula which contains a relationship as expressed in EQN 3.

New Tool*K* offset=Current Tool *K* offset−(tool weight×Lot *N* tool offset−Current Tool *K* offset+ Lot *N* measured parameter value−Device *J* parameter target))    EQN. 3

Computing a new value for the Tool K offset as described in reference to step (6024) may advantageously account for parameter measurements of lots which are performed in a different sequence than processing of the lots.

Next, step (6026) is to store the new Tool K offset value as the current Tool K offset in a storage medium (6028).

Step (6030) is to compute a new value for the Device J offset, using a formula which contains a relationship as expressed in EQN 4.

New Device *J* offset=Current Device *J* offset+(device weight×(Lot *N* device offset−Current Device *J* offset+Lot *N* measured parameter value−Device *J* parameter target))    EQN. 4

Computing a new value for the Device J offset as described in reference to step (6030) may advantageously account for parameter measurements of lots which are performed in a different sequence than processing of the lots.

Next, step (6032) is to store the new Device J offset value as the current Device J offset in a storage medium (6034).

In an alternate embodiment, step (6024) and step (6030) may be performed in another order. After the new value for the Tool K offset and the new value for the Device J offset are computed and stored, the process for updating the Tool K offset and the Device J offset is ended (6036).

Figure 7:
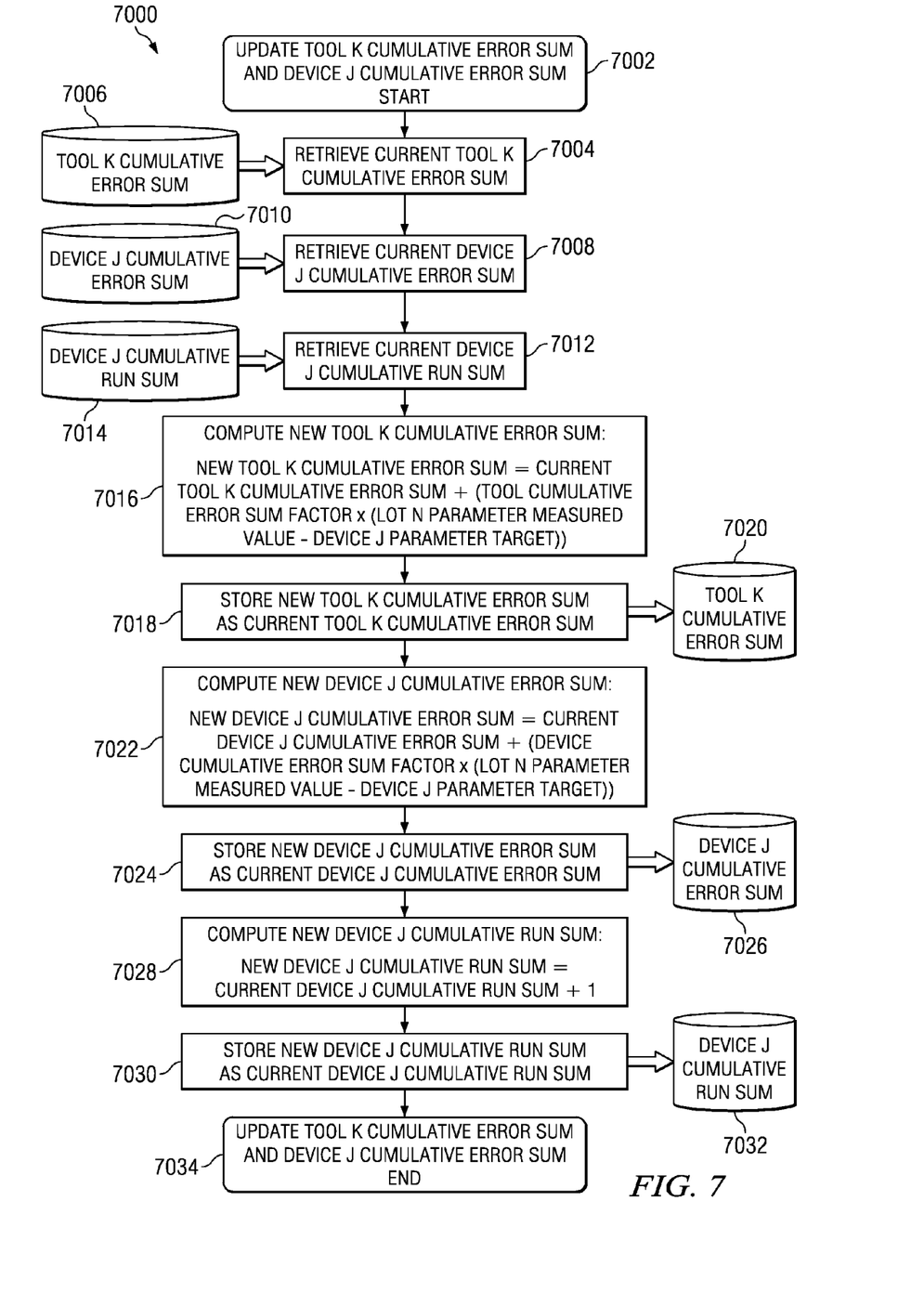
FIG. 7 is a flowchart of an embodiment of steps involved in updating the Tool K cumulative error sum and the Device J cumulative error sum.

FIG. 7 is a flowchart (7000) of an embodiment of steps involved in updating the Tool K cumulative error sum and the Device J cumulative error sum. The steps begin (7002) with step (7004) which is to retrieve a stored current value (7006) of the Tool K cumulative error sum. Step (7008) is to retrieve a stored current value (7010) of the Device J cumulative error sum. Step (7012) is to retrieve a stored current value (7014) of a Device J cumulative run sum. In another embodiment, steps (7004), (7008) and (7012) may be performed in another order.

Subsequently, step (7016) is executed, which is to compute a new Tool K cumulative error sum, using a formula which contains a relationship as expressed in EQN. 5.

$$\text{New Tool } K \text{ cumulative error sum} = \text{Current Tool } K \text{ cumulative error sum} + (\text{tool cumulative error sum factor} \times (\text{Lot } N \text{ measured parameter value} - \text{Device } J \text{ parameter target})) \quad \text{EQN. 5}$$

Computing the Tool K cumulative error sum as described in reference to step (7016) may advantageously prevent errors due to untuned device offsets from affecting the Tool K offset.

Next, step (7018) is to store the new Tool K cumulative error sum as the current Tool K cumulative error sum in a storage medium (7020).

Step (7022) to compute a new Device J cumulative error sum, using a formula which contains a relationship as expressed in EQN. 6.

$$\text{New Device } J \text{ cumulative error sum} = \text{Current Device } J \text{ cumulative error sum} + (\text{device cumulative error sum factor} \times (\text{Lot } N \text{ measured parameter value} - \text{Device } J \text{ parameter target})) \quad \text{EQN. 6}$$

Computing the Device J cumulative error sum as described in reference to step (7022) may advantageously prevent errors due to untuned tool offsets from affecting the Device J offset.

Next, step (7024) is to store the new Device J cumulative error sum as the current Device J cumulative error sum in a storage medium (7026).

Step (7028) to compute a new Device J cumulative run sum, using a formula which contains a relationship as expressed in EQN. 7.

$$\text{New Device } J \text{ cumulative run sum} = \text{Current Device } J \text{ cumulative run sum} + 1 \quad \text{EQN. 7}$$

Next, step (7030) is to store the new Device J cumulative run sum as the current Device J cumulative run sum in a storage medium (7032).

In an alternate embodiment, steps (7018), (7024) and (7030) may be performed in another order. After the new value for the Tool K cumulative error sum, the new value for the Device J cumulative error sum and the new value for the Device J cumulative run sum are computed and stored, the process for updating the Tool K cumulative error sum and the Device J cumulative error sum is ended (7034).

Figure 8:
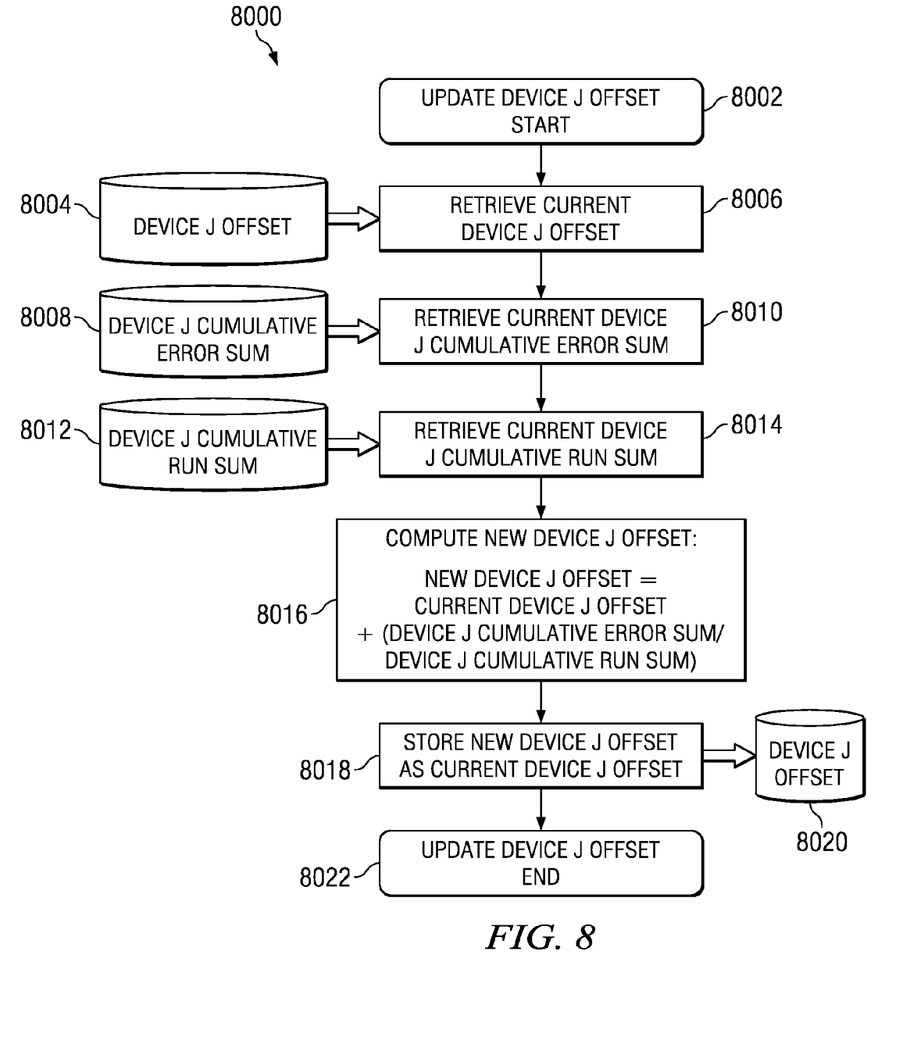
FIG. 8 is a flowchart of an embodiment of steps involved in updating the Device J offset.

FIG. 8 is a flowchart (8000) of an embodiment of steps involved in updating the Device J offset. The steps begin (8002) with step (8004), which is to retrieve a stored current value (8006) of the Device J offset. Step (8008) is to retrieve a stored current value (8010) of the Device J cumulative error sum. Step (8012) is to retrieve a stored current value (8014) of the Device J cumulative run sum. In another embodiment, steps (8004), (8008) and (8012) may be performed in another order.

Subsequently, step (8016) is executed, which is to compute a new value of the Device J offset, for example using EQN. 8.

$$\text{New Device } J \text{ offset} = \frac{\text{Current Device } J \text{ offset} - \text{Current Device } J \text{ cumulative error sum}}{\text{Current Device } J \text{ cumulative run sum}} \quad \text{EQN. 8}$$

Next, step (8018) is to store the new Device J offset as the current Device J offset in a storage medium (8020). After the new value for the Device J offset is computed and stored, the process for updating the Device J offset is ended (8022).

What is claimed is:

1. A manufacturing process, comprising the steps:
providing a first workpiece of a first device type;
providing a parameter target value for said workpiece;
providing a first tool;
computing a first tool setting for said first tool, such that said first tool setting includes a first tool offset divided by a first tool process factor, and a first device offset divided by said first tool process factor;
performing a fabrication step on said workpiece using said first tool at said first tool setting;
measuring a device parameter value of said workpiece after said fabrication step is performed;
computing an error value, said error value being a difference between said measured device parameter value and said parameter target value;
generating a value for a tool weight;
generating a value for a device weight, such that exactly one of said tool weight and said device weight is assigned a non-interference value;
generating an updated tool offset by adjusting a current tool offset of said first tool by a product of said tool weight and a sum of said error value and a difference between said first tool offset and said current tool offset;
generating an updated device offset of said first device type by adjusting a current device offset of said first device type by a product of said device weight and a sum of said error value and a difference between said first device offset and said current device offset;
providing a second workpiece; and
performing said fabrication step on said second workpiece using said first tool or a second tool at an updated tool setting, said updated tool setting using at least one of said updated tool offset and said updated device offset, wherein if said first tool is used, said second workpiece is said first device type or a second device type, and if said second tool is used, said second workpiece is said first device type.

2. The manufacturing process of claim 1, further including the steps:
generating a tool cumulative error sum factor;
incrementing a tool cumulative error sum by a product of said tool cumulative error sum factor and said error value;
generating a device cumulative error sum factor; and
incrementing a device cumulative error sum of said first device type by a product of said device cumulative error sum factor and said error value.

3. The manufacturing process of claim 2, further including the step of adjusting said updated device offset by an amount proportional to said device cumulative error sum.

4. The manufacturing process of claim 2, in which:
said device weight is assigned a non-interference value;
said tool cumulative error sum factor is assigned a value of 1; and
said device cumulative error sum factor is assigned a value of 1.

5. The manufacturing process of claim 2, in which:
said tool weight is assigned an untuned tool weight value;
said device weight is assigned a non-interference value;
said tool cumulative error sum factor is assigned a low incrementing value; and
said device cumulative error sum factor is assigned a low incrementing value.

6. The manufacturing process of claim 2, in which:
said tool weight is assigned a non-interference value;
said device weight is assigned an untuned device weight value;
said tool cumulative error sum factor is assigned a low incrementing value; and
said device cumulative error sum factor is assigned low incrementing value.

7. The process of claim 6, in which said untuned device weight value is less than a previously assigned untuned device weight value of said first device type.

8. The process of claim 7, in which a sum of all untuned device weight values of said first device type is between 2.75 and 3.5.

9. A process of forming an integrated circuit, comprising the steps:
providing a first semiconductor substrate of a first integrated circuit design;
providing a parameter target value for said integrated circuit;
providing a first semiconductor processing tool;
computing a first tool setting for said first semiconductor processing tool, such that said first tool setting includes a first tool offset divided by a first tool process factor, and a first integrated circuit design offset value divided by said first tool process factor;
performing a fabrication step on said first semiconductor substrate using said first semiconductor processing tool at said first tool setting;
measuring an integrated parameter value of said integrated circuit after said fabrication step is performed;
computing an error value, said error value being a difference between said measured integrated circuit parameter value and said parameter target value;
generating a value for a tool weight;
generating a value for a device weight, such that exactly one of said tool weight and said device weight is assigned a non-interference value;
generating an updated tool offset by adjusting a current tool offset of said first semiconductor processing tool by a product of said tool weight and a sum of said error value and a difference between said first tool offset and said current tool offset;
generating an updated integrated circuit design offset of said first integrated circuit design by adjusting a current integrated circuit design offset of said first integrated circuit design by a product of said device weight and a sum of said error value and a difference between said first integrated circuit design offset and said current integrated circuit design offset;
providing a second semiconductor substrate; and
performing said fabrication step on said second semiconductor substrate using said first semiconductor processing tool or a second semiconductor processing tool at an updated tool setting, said updated tool setting using at least one of said updated tool offset and said updated integrated circuit design offset, wherein if said first semiconductor processing tool is used, said second semiconductor substrate is of said first integrated circuit design or a second integrated circuit design, and if said second semiconductor processing tool is used, said second semiconductor substrate is of said first integrated circuit design.

10. The process of claim 9, further including the steps:
generating a tool cumulative error sum factor;
incrementing a tool cumulative error sum by a product of said tool cumulative error sum factor and said error value;
generating a device cumulative error sum factor; and
incrementing a device cumulative error sum by a product of said device cumulative error sum factor and said error value.

11. The process of claim 10, further including the step of adjusting said updated integrated circuit design offset by an amount proportional to said device cumulative error sum.

12. The process of claim 10, in which:
said device weight is assigned a non-interference value;
said tool cumulative error sum factor is assigned a value of 1; and
said device cumulative error sum factor is assigned a value of 1.

13. The process of claim 12, in which said device weight is assigned a value of zero.

14. The process of claim 10, in which:
said tool weight is assigned an untuned tool weight value;
said device weight is assigned a non-interference value;
said tool cumulative error sum factor is assigned a low incrementing value; and
said device cumulative error sum factor is assigned low incrementing value.

15. The process of claim 14, in which:
said device weight is assigned a value of zero;
said tool cumulative error sum factor is assigned a value of zero; and
said device cumulative error sum factor is assigned a value of zero.

16. The process of claim 10, in which:
said tool weight is assigned a non-interference value;
said device weight is assigned an untuned device weight value;
said tool cumulative error sum factor is assigned a low incrementing value; and
said device cumulative error sum factor is assigned a low incrementing value.

17. The process of claim 16, in which:
said tool weight is assigned a value of zero;
said tool cumulative error sum factor is assigned a value of zero; and
said device cumulative error sum factor is assigned a value of zero.

18. The process of claim 16, in which said untuned device weight value is less than a previously assigned untuned device weight value.

19. The process of claim 18, in which a sum of untuned device weight values is between 2.75 and 3.5.

20. The process of claim 10, in which said first semiconductor processing tool is a photolithographic exposure tool.

* * * * *